United States Patent
Kim et al.

(10) Patent No.: US 10,551,929 B2
(45) Date of Patent: Feb. 4, 2020

(54) MOBILE TERMINAL AND CONTROLLING METHOD THEREOF

(71) Applicant: LG ELECTRONICS INC., Seoul (KR)

(72) Inventors: Taeseong Kim, Seoul (KR); Jisun Lee, Seoul (KR); Soyeon Yim, Seoul (KR); Eugene Myung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 921 days.

(21) Appl. No.: 14/518,952

(22) Filed: Oct. 20, 2014

(65) Prior Publication Data

US 2015/0362999 A1    Dec. 17, 2015

(30) Foreign Application Priority Data

Jun. 17, 2014  (KR) ........................ 10-2014-0073818

(51) Int. Cl.
*G06F 3/01*       (2006.01)
*G06F 3/0482*     (2013.01)
(Continued)

(52) U.S. Cl.
CPC .............. *G06F 3/017* (2013.01); *G06F 3/014* (2013.01); *G06F 3/0482* (2013.01);
(Continued)

(58) Field of Classification Search
CPC ........ G06F 3/014; G06F 3/017; G06F 3/0482; G06F 3/0485; H04L 65/403; H04L 67/125; H04M 1/72533; H04M 1/72583
(Continued)

(56) References Cited

U.S. PATENT DOCUMENTS 6,477,117 B1 * 11/2002 Narayanaswami .. G04G 13/026
                                                  368/224
8,884,874 B1 * 11/2014 Kim ........................ G06F 3/017
                                                  345/156

(Continued)

FOREIGN PATENT DOCUMENTS

CN          102998969          3/2013
CN          103217895          7/2013
(Continued)

OTHER PUBLICATIONS

Cipriani, "How to send a message, set a reminder when declining a call on iOS 6—CNET," XP055219499, Sep. 2012, 6 pages.

(Continued)

*Primary Examiner* — Matthew Ell
*Assistant Examiner* — Maria S Ayad
(74) *Attorney, Agent, or Firm* — Lee, Hong, Degerman, Kang & Waimey PC

(57) ABSTRACT

A mobile terminal and controlling method thereof are disclosed, by which a mobile terminal of a watch type can be remotely controlled. The present invention includes a wireless communication unit configured to perform a wireless communication, a sensing unit configured to sense a gesture input, a display unit configured to output an information, and a controller, if a first type gesture is inputted, controlling at least one of a display of a detailed information of an unidentified event, a response to an event occurrence and an activation of a prescribed application to be performed in response to the inputted first type gesture.

15 Claims, 36 Drawing Sheets

<Gesture of moving wrist to draw a circle clockwise>

<Gesture of moving wrist to draw a circle counterclockwise>

Increase brightness of display unit

Decrease brightness of display unit

(51) Int. Cl.
*G06F 3/0485* (2013.01)
*H04L 29/06* (2006.01)
*H04L 29/08* (2006.01)
*H04M 1/725* (2006.01)

(52) U.S. Cl.
CPC .......... *G06F 3/0485* (2013.01); *H04L 65/403* (2013.01); *H04L 67/125* (2013.01); *H04M 1/72533* (2013.01); *H04M 1/72583* (2013.01)

(58) Field of Classification Search
USPC ........................................................ 715/716
See application file for complete search history.

(56) References Cited

U.S. PATENT DOCUMENTS

| | | | | |
|---|---|---|---|---|
| 9,141,194 | B1* | 9/2015 | Keyes | G06F 3/017 |
| 9,442,570 | B2* | 9/2016 | Slonneger | G06F 3/017 |
| 2006/0028429 | A1* | 2/2006 | Kanevsky | G06F 3/017 |
| | | | | 345/156 |
| 2013/0058197 | A1 | 3/2013 | Yonekura | |
| 2013/0115931 | A1* | 5/2013 | Richardson | H04W 4/20 |
| | | | | 455/417 |
| 2014/0125618 | A1* | 5/2014 | Panther | A61B 5/6838 |
| | | | | 345/173 |
| 2014/0139454 | A1 | 5/2014 | Mistry et al. | |
| 2014/0160078 | A1 | 6/2014 | Seo et al. | |
| 2014/0267024 | A1* | 9/2014 | Keller | G06F 3/017 |
| | | | | 345/156 |
| 2014/0320434 | A1* | 10/2014 | Pantel | G06F 3/017 |
| | | | | 345/173 |
| 2015/0065104 | A1* | 3/2015 | White | H04M 3/565 |
| | | | | 455/416 |
| 2015/0094031 | A1* | 4/2015 | Liu | H04M 3/02 |
| | | | | 455/412.2 |
| 2015/0121227 | A1* | 4/2015 | Peng | G06F 3/167 |
| | | | | 715/727 |
| 2015/0160621 | A1* | 6/2015 | Yilmaz | G04G 9/0064 |
| | | | | 368/10 |
| 2015/0177841 | A1* | 6/2015 | VanBlon | G06F 3/017 |
| | | | | 715/863 |
| 2015/0188861 | A1* | 7/2015 | Esplin | H04L 51/06 |
| | | | | 709/206 |
| 2015/0220154 | A1* | 8/2015 | Midholt | G06F 3/014 |
| | | | | 345/156 |
| 2016/0027399 | A1* | 1/2016 | Wilde | G06F 13/382 |
| | | | | 345/520 |
| 2018/0032997 | A1* | 2/2018 | Gordon | G06Q 20/3224 |

FOREIGN PATENT DOCUMENTS

| | | |
|---|---|---|
| CN | 103442129 | 12/2013 |
| CN | 103777752 | 5/2014 |
| EP | 2194698 | 6/2010 |

OTHER PUBLICATIONS

European Patent Office Application Serial No. 14004081.7, Search Report dated Oct. 19, 2015, 11 pages.
The State Intellectual Property Office of the People's Republic of China Application Serial No. 201510184158.3, Office Action dated Jan. 4, 2018, 26 pages.
The State Intellectual Property Office of the People's Republic of China Application Serial No. 201510184158.3, Office Action dated Sep. 21, 2018, 12 pages.

* cited by examiner

FIG. 3a
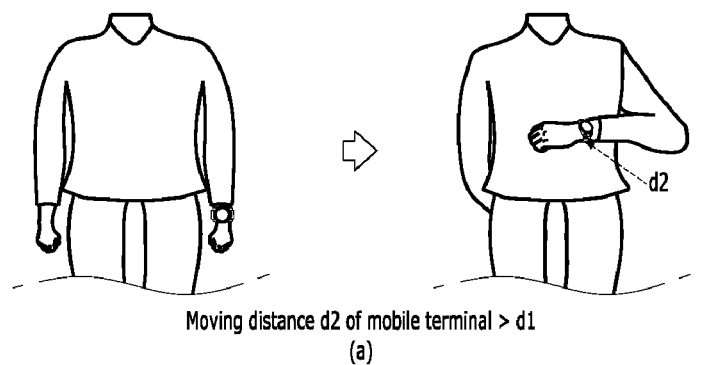
Moving distance d2 of mobile terminal > d1
(a)
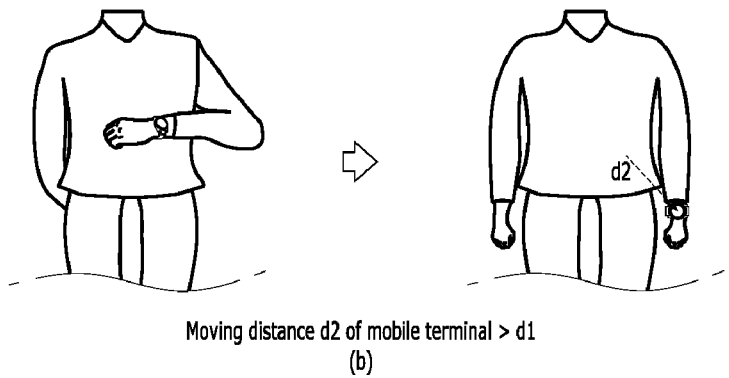
Moving distance d2 of mobile terminal > d1
(b)

FIG. 3c
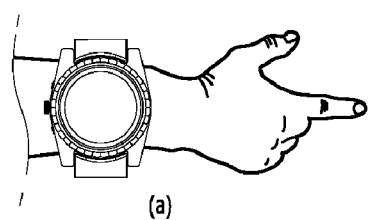
(a)
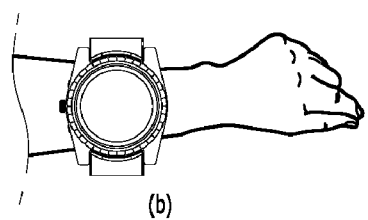
(b)

FIG. 5(a)
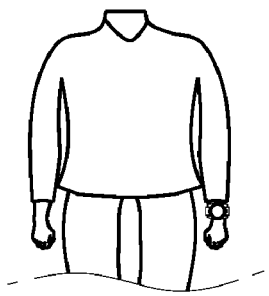
Power saving mode
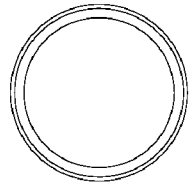
Display Off
FIG. 5(b)
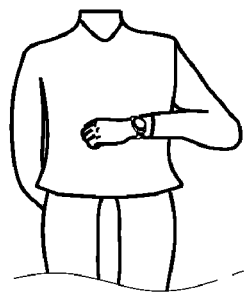
first type gesture input
12:00
Sunday
September 28
Display On FIG. 6(a)
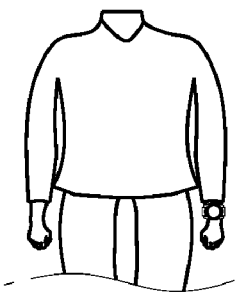
Message reception
Display indicator
FIG. 6(b)
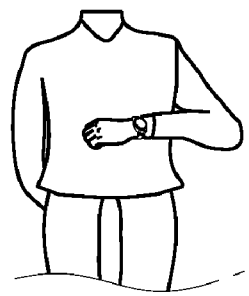
first type gesture input
Display detailed content of message

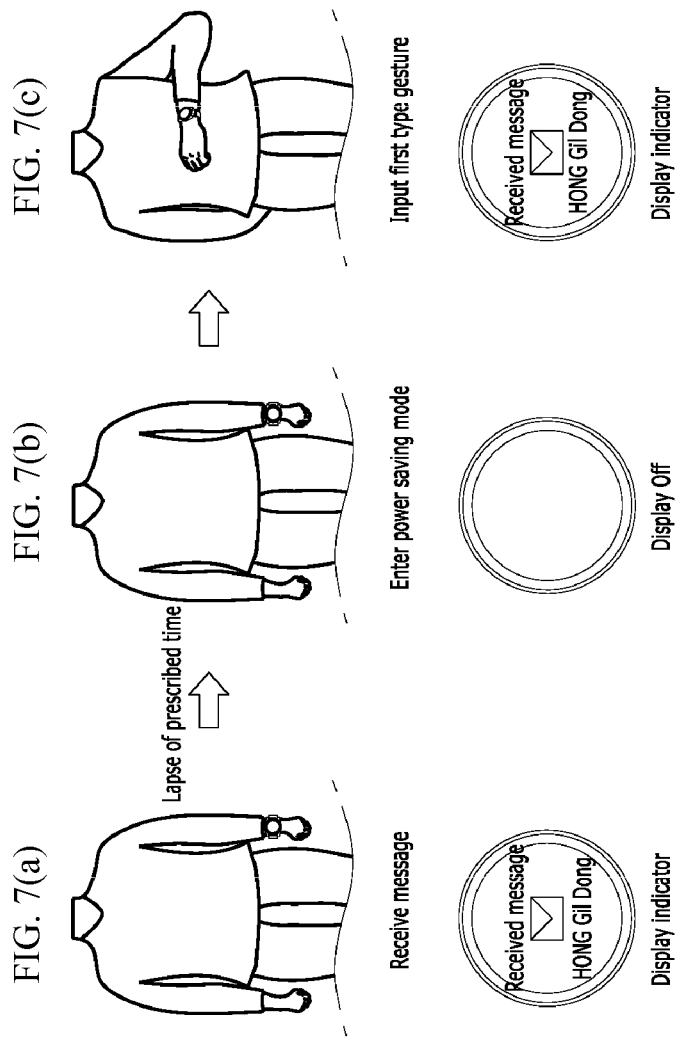

FIG. 8(a)
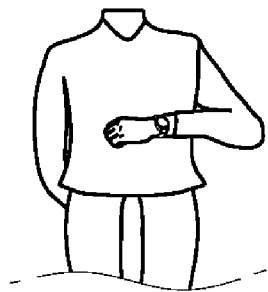
Display detailed content of message
FIG. 8(b)
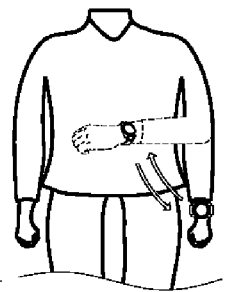
Re-input first type gesture
Display message composing screen FIG. 9a
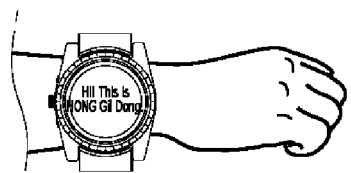
Display detailed content of message
(a)
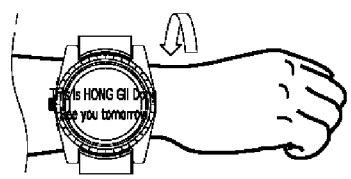
<Twist wrist slowly>
Scroll detailed content of message
(b)

FIG. 9b
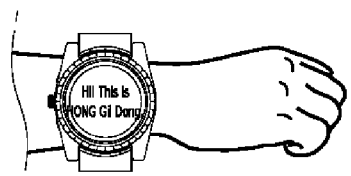
Display detailed content of message
(a)
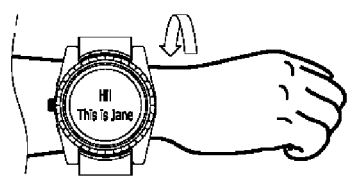
<Twist wrist quickly>
Display next message
(b)

<Gesture of spreading fingers>
Enlarge and display next one

<Gesture of narrowing fingers>
Reduce and display message

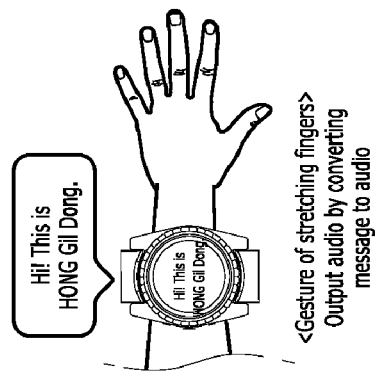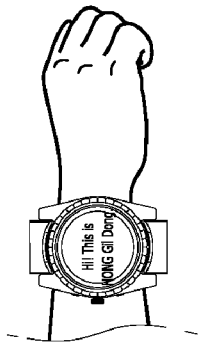

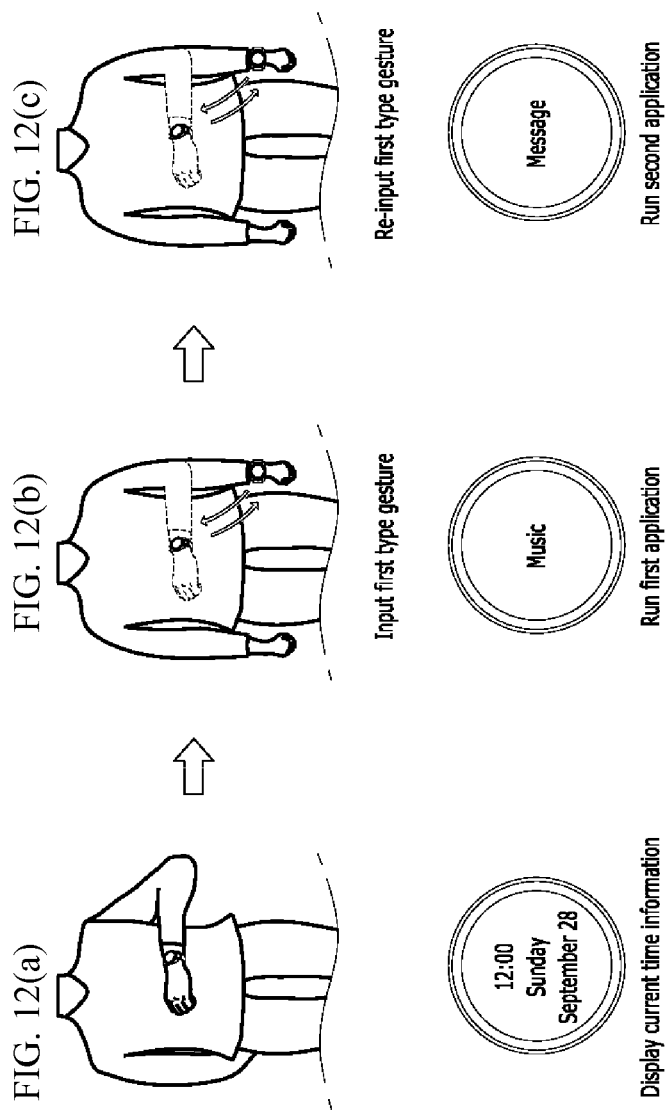

<Gesture of stretching fingers>
Play multimedia file

<Gesture of folding fingers>
Stop multimedia file play

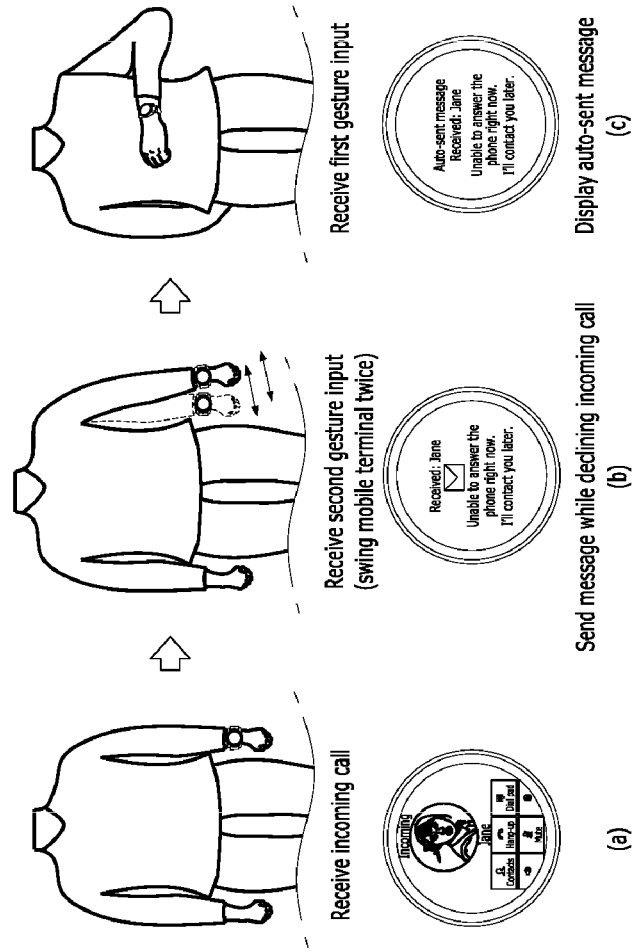

FIG. 21(a)
Sound output mode
FIG. 21(b)
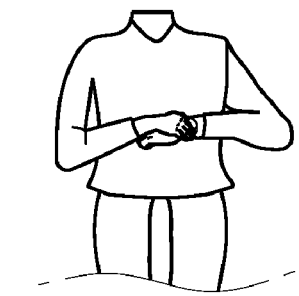
Vibration output mode FIG. 22(a)
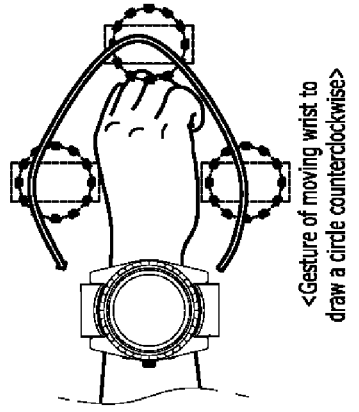
<Gesture of moving wrist to draw a circle clockwise>
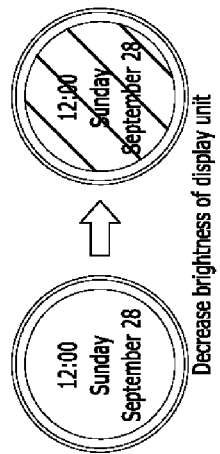
Increase brightness of display unit
FIG. 22(b)
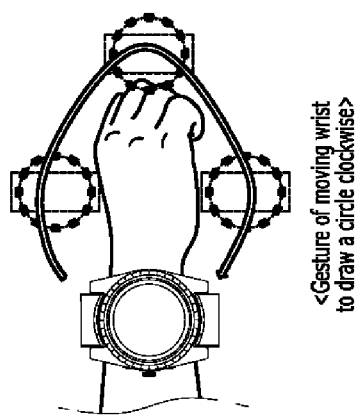
<Gesture of moving wrist to draw a circle counterclockwise>
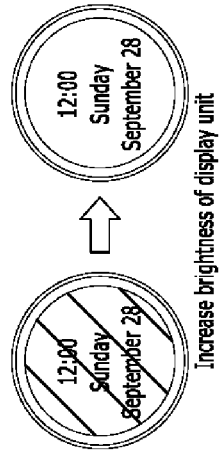
Decrease brightness of display unit

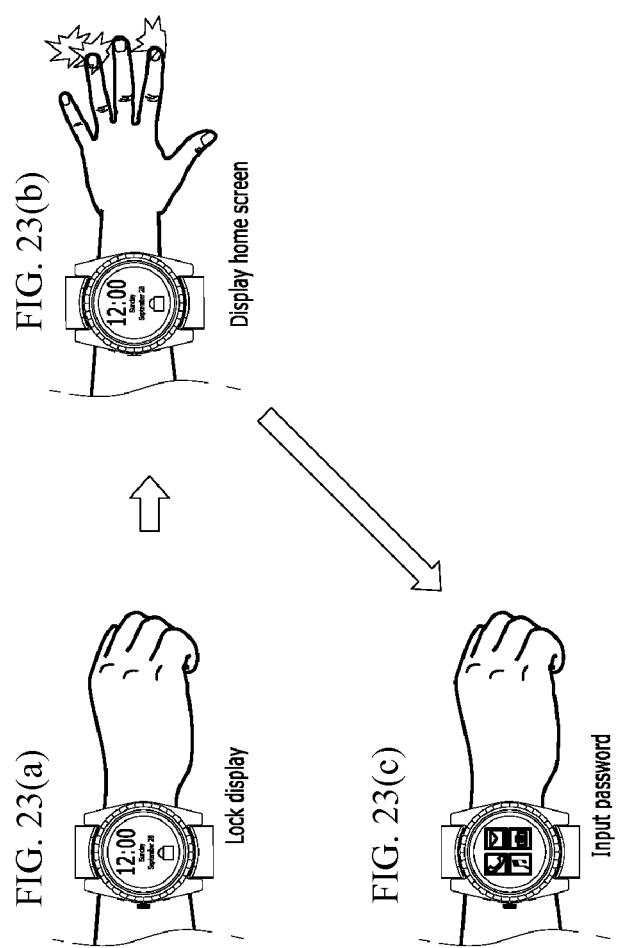

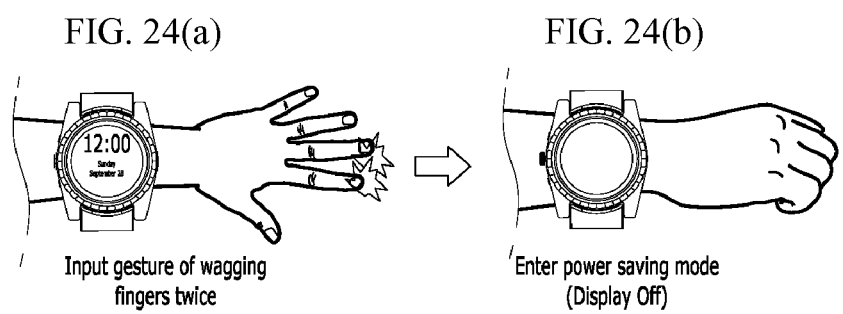
FIG. 24(a) Input gesture of wagging fingers twice
FIG. 24(b) Enter power saving mode (Display Off)

Setting vale of mobile terminal

Case that user is exercising

FIG. 26a
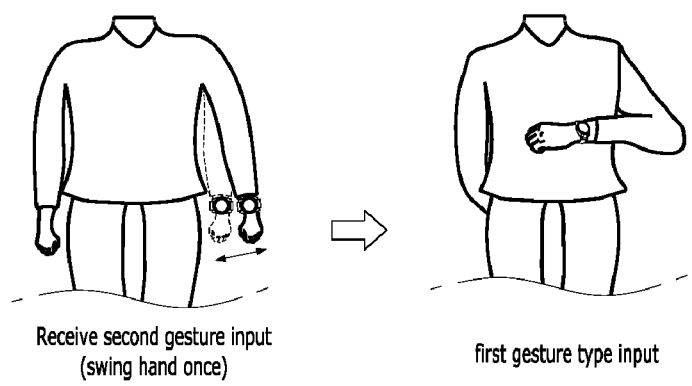
Receive second gesture input
(swing hand once)
first gesture type input
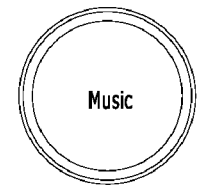
Run first application FIG. 26b
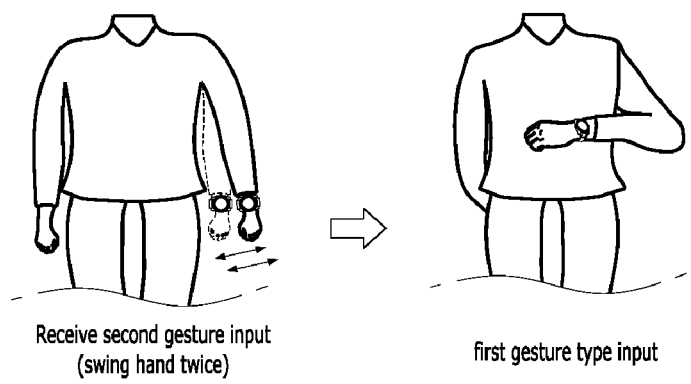
Receive second gesture input (swing hand twice)     first gesture type input
Run second application

MOBILE TERMINAL AND CONTROLLING METHOD THEREOF

Pursuant to 35 U.S.C. § 119(a), this application claims the benefit of earlier filing date and right of priority to Korean Application No. 10-2014-0073818, filed on Jun. 17, 2014, the contents of which are hereby incorporated by reference herein in its entirety.

BACKGROUND OF THE INVENTION

Field of the Invention

The present invention relates to a mobile terminal, and more particularly, to a mobile terminal and controlling method thereof. Although the present invention is suitable for a wide scope of applications, it is particularly suitable for remotely controlling a mobile terminal of a watch type.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

In order to further enhance mobility and portability of a mobile terminal, many ongoing efforts are made to research and develop a mobile terminal of a wrist-wearable type like a watch. However, since a mobile terminal of a watch type is provided with a display unit in limited size, a user has difficulty in touching a screen of the watch type mobile terminal unlike a conventional mobile terminal. If a new input method for manipulating a mobile terminal of a watch type appropriately is developed, it is able to further facilitate manipulation of the watch type mobile terminal appropriately.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which the mobile terminal can be remotely controlled based on a user's gesture input.

Another object of the present invention is to provide a mobile terminal and controlling method thereof, by which a user is facilitated to remotely control the mobile terminal in a manner that a gesture input for performing a content change or a mode change and a gesture input for performing a general control operation without the content change or the mode change are discriminated from each other depending on a type of a gesture input.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal of a watch type according to the present invention may include a wireless communication unit configured to perform a wireless communication, a sensing unit configured to sense a gesture input, a display unit configured to output an information, and a controller, if a first type gesture is inputted, controlling at least one of a display of a detailed information of an unidentified event, a response to an event occurrence and an activation of a prescribed application to be performed in response to the inputted first type gesture.

In another aspect of the present invention, as embodied and broadly described herein, a method of controlling a mobile terminal of a watch type according to the present invention may include the steps of receiving a first type gesture and performing at least one of a display of a detailed information of an unidentified event, a response to an event occurrence and an activation of a prescribed application in response to the first type gesture.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 3A to 3C are diagrams for examples of various gesture inputs;

FIGS. 5(a) and 5(b) are diagrams for one example of cancelling a power saving mode of a mobile terminal if a first type gesture is inputted;

FIGS. 6(a) and 6(b) are diagrams for one example of displaying detailed information of an event if a first type gesture is inputted;

FIGS. 7(a) to 7(c) are diagrams for one example of outputting an indicator indicating an event occurrence if a first type gesture is inputted;

FIGS. 8(a) and 8(b) are diagrams for an operation of a mobile terminal if a first type gesture is inputted in the course of displaying detailed information of an event;

FIG. 9A and FIG. 9B are diagrams for example of an operation of a mobile terminal if a second type gesture is inputted;

FIGS. 11(a) and 11(b) are diagrams for example of an operation of a mobile terminal if a second type gesture is inputted;

FIGS. 12(a) to 12(c) are diagrams for one example of running a prescribed application;

FIGS. 19A to 19C are diagrams for examples of an operation of a mobile terminal if a gesture input is received on receiving an incoming call;

FIGS. 21(a) and 21(b) are diagrams for one example of adjusting a vibration mode and an audio output mode by a gesture input;

FIGS. 22(a) and 22(b) are diagrams for one example of adjusting a brightness of a display unit;

FIGS. 23(a) to 23(c) are diagrams for one example of unlocking a display unit;

FIGS. 24(a) and 24(b) are diagrams for one example of switching a mode of a mobile terminal to a power saving mode;

FIG. 26A and FIG. 26B are diagrams for one example of adjusting an application to run in response to an input count of a second type gesture.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
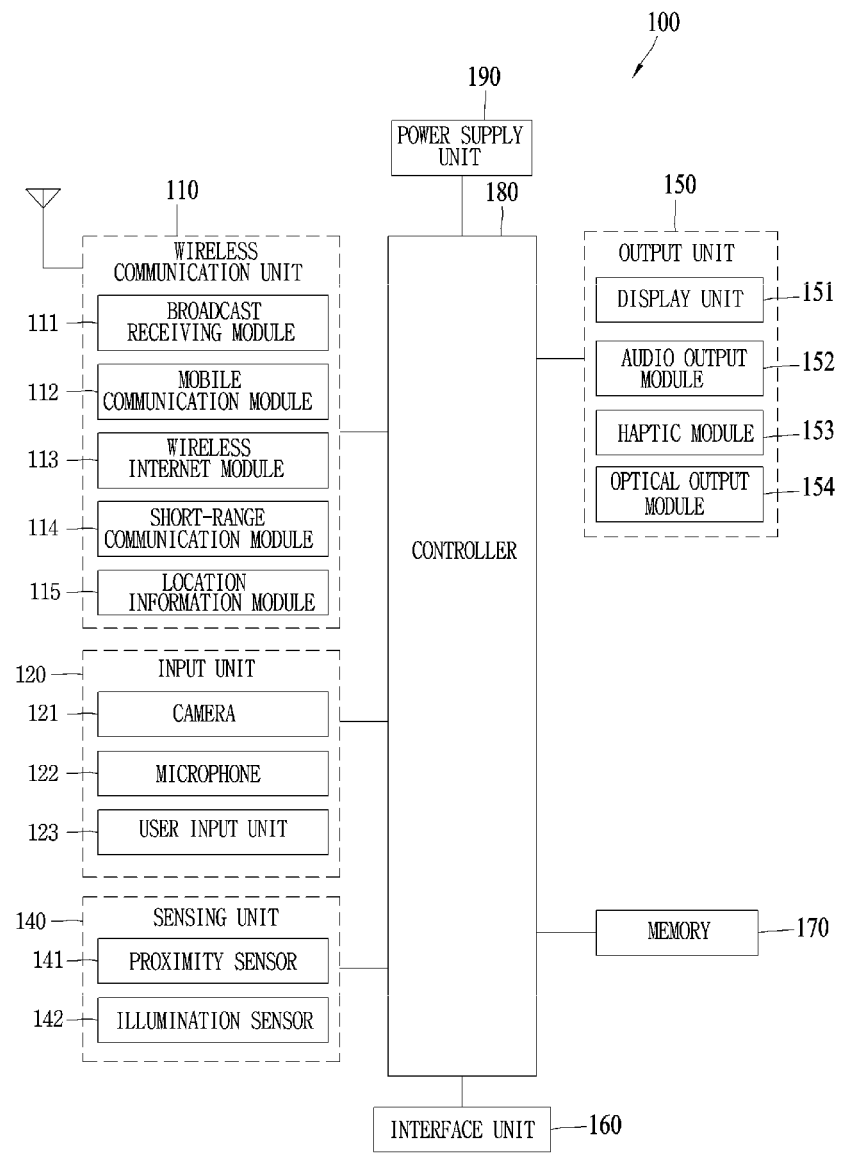
FIG. 1A is a block diagram of a mobile terminal in accordance with the present disclosure.
Figure 1B:
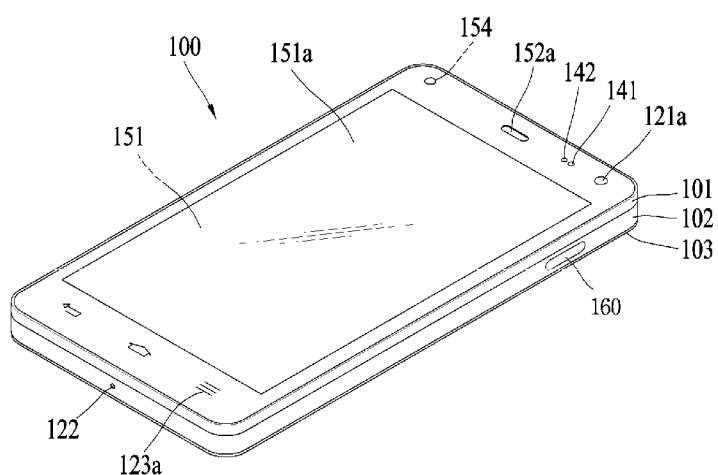
FIGS. 1B and 1C are conceptual views of one example of the mobile terminal, viewed from different directions.
Figure 1C:
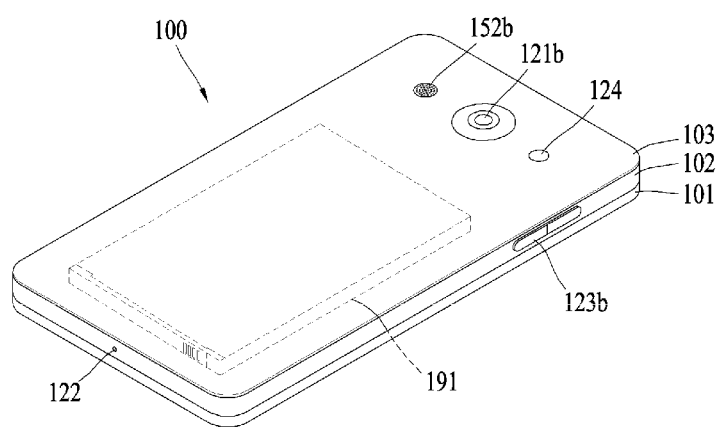

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a BLUETOOTH port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
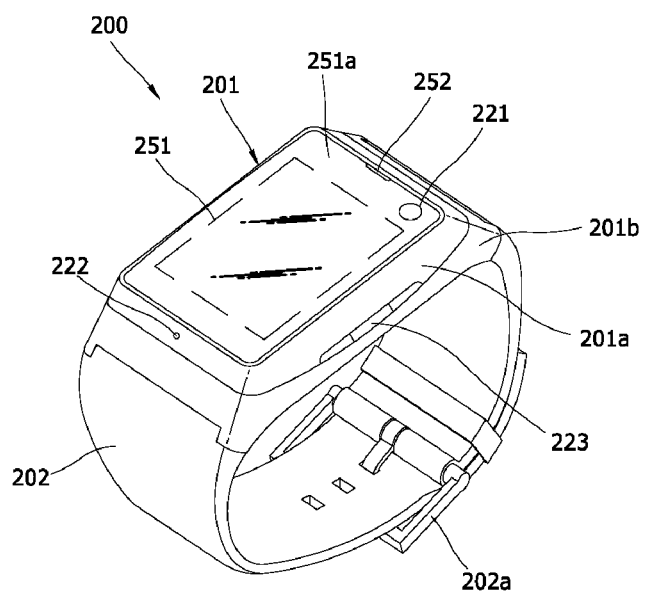
FIG. 2 is a perspective diagram for one example of a watch-type mobile terminal in accordance with another exemplary embodiment.

FIG. 2 is a perspective view illustrating one example of a watch-type mobile terminal 200 in accordance with another exemplary embodiment. As illustrated in FIG. 2, the watch-type mobile terminal 200 includes a main body 201 with a display unit 351 and a band 202 connected to the main body 201 to be wearable on a wrist. In general, mobile terminal 200 may be configured to include features that are the same or similar to that of mobile terminal 100 of FIGS. 1A-1C.

The main body 201 may include a case having a certain appearance. As illustrated, the case may include a first case 201*a* and a second case 201*b* cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 351 is shown located at the front side of the main body 201 so that displayed information is viewable to a user. In some embodiments, the display unit 351 includes a touch sensor so that the display unit can function as a touch screen. As illustrated, window 351*a* is positioned on the first case 201*a* to form a front surface of the terminal body together with the first case 201*a*.

The illustrated embodiment includes audio output module 352, a camera 321, a microphone 322, and a user input unit 323 positioned on the main body 201. When the display unit 351 is implemented as a touch screen, additional function keys may be minimized or eliminated. For example, when the touch screen is implemented, the user input unit 323 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202*a*. The fastener 202*a* may be implemented into a buckle type, a snap-fit hook structure, a Velcro® type, or the like, and include a flexible section or material. The drawing illustrates an example that the fastener 202*a* is implemented using a buckle.

For clarity and convenience of the following description, assume that a mobile terminal 100 according to the present invention is the watch type mobile terminal shown in FIG. 2 for example. And, assume that the mobile terminal 100 according to the present invention includes at least one of the components shown in FIGS. 1A to 1C. In particular, the mobile terminal 100 according to the present invention can be assumed as including the wireless communication unit 110, the sensing unit 140, the display unit 151 and the controller 180.

The mobile terminal 100 according to the present invention can receive a user's gesture input based on a sensing signal of the sensing unit 140. In doing so, the controller 180 is able to determine what kind of a gesture input is received through at least one of factors including a moving distance of the mobile terminal 100, a rotation angle of the mobile terminal 100 and a speed of the mobile terminal 100.

Figure 3B:
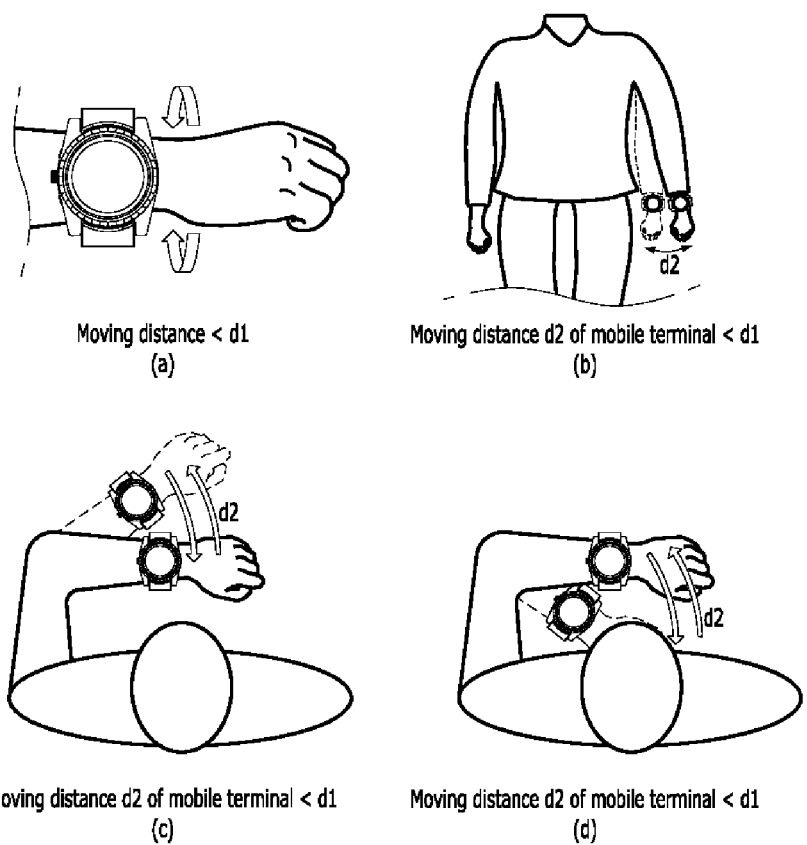

FIGS. 3A to 3C are diagrams for examples of various gesture inputs. Like the example shown in FIG. 3A (a), the mobile terminal 100 can receive a gesture input performed in a manner that a hand having a watch type mobile terminal worn thereon is stretched toward a floor and then moves by being folded toward a body of a user. Like the example shown in FIG. 3A (b), the mobile terminal 100 can receive a gesture input performed in a manner of stretching out a hand folded toward a user body.

Like the example shown in FIG. 3B (a), the mobile terminal 100 can receive a gesture input performed in a manner of twisting a wrist on which a watch type mobile terminal is worn. Like the example shown in FIG. 3B (b), the mobile terminal 100 can receive a gesture input performed in a manner of swinging a hand on which a watch type mobile terminal is worn. Like the example shown in FIG. 3B

(c) or FIG. 3B (d), the mobile terminal 100 can receive a gesture input of moving the mobile terminal 100 in a short distance toward or far away from a user body.

The mobile terminal 100 according to the present invention can receive a small gesture input by sensing a muscular movement of a wrist part on which the mobile terminal 100 is worn. To this end, the mobile terminal can include a magnetic sensor configured to sense a magnetic variation in accordance with a movement of muscle, a pressure sensor configured to sense a pressure applied by a muscular movement, a ultrasonic wave sensor configured to sense a muscular movement by emitting ultrasonic waves and then sensing the reflected ultrasonic waves, and the like. When fingers are used, each finger uses a different muscle. Overall muscles used to move a single finger are different from overall muscles used to move several fingers. When the muscles are used to move finger(s), they change differently as well. Hence, based on a sensing signal of the sensing unit 140 configured to sense a change of a muscular movement, the controller 180 is able to determine how a specific finger of a user has moved.

For instance, like the example shown in FIG. 3C (a), the mobile terminal 100 can receive a gesture input performed in a manner of spreading two fingers (e.g., a thumb and an index finger, etc.). For another instance, like the example shown in FIG. 3C (b), the mobile terminal 100 can receive a gesture input performed in a manner of narrowing two fingers (e.g., a thumb and an index finger, etc.).

In doing so, in order to discriminate a movement of a user's arm in everyday working and living environments from a gesture input, the controller 180 can further consider a moving speed of the mobile terminal 100. In particular, when the mobile terminal 100 is moved or rotated, if a moving speed of the mobile terminal 100 is equal to or higher than a prescribed speed, it can be determined as a gesture input. On the other hand, if a moving speed of the mobile terminal 100 is lower than the prescribed speed, it can be determined as not a gesture input.

Various gesture inputs shown in FIGS. 3A to 3C can be sorted into a first type gesture and a second type gesture based on at least one of a moving distance of the mobile terminal 100, a rotated angle of the mobile terminal 100 and a moving speed of the mobile terminal 100. For instance, like the example shown in FIG. 3A, the first type gesture may include an action of moving the mobile terminal 100 of the watch type worn on a wrist in a distance equal to or greater than a prescribed distance or an action of rotating the mobile terminal 100 of the watch type worn on a wrist at an angle equal to or greater than a prescribed angle while worn on a wrist. On the other hand, like the example shown in FIG. 3B, the second type gesture may include an action of moving the mobile terminal 100 of the watch type worn on a wrist in a distance smaller than a prescribed distance or an action of rotating the mobile terminal 100 of the watch type worn on a wrist at an angle smaller than a prescribed angle. Like the example shown in FIG. 3C, the second type gesture may include an action of moving finger(s) of a hand on which the mobile terminal 100 is worn.

If the first type gesture is inputted, the mobile terminal 100 according to the present invention can control a displayed content or an operation mode to be changed. For instance, if the first type gesture is inputted, the controller 180 can change a displayed content in a manner of controlling the display unit 151 to switch to a screen for checking a detailed history of an event in the course of outputting a home screen (or a lock screen), controlling the display unit 151 to output a prescribed application in the course of outputting a home screen (or a lock screen)m controlling the display unit 151 to output a second application in the course outputting a first application, or the like. For another instance, while the controller 180 operates in a read mode for checking an event content by displaying a detailed information of an event, if the first type gesture is inputted, the controller 180 can change an operation mode of the mobile terminal 100 into a call mode or a write mode (e.g., a text inputtable state, etc.).

If the second type gesture is inputted, the mobile terminal 100 can control a control operation, which is appropriate for a currently running application, to be performed without changing a displayed content.

An operation of the mobile terminal 100 in response to an input of a first/second type gesture is described in detail with reference to the accompanying drawings as follows.

Figure 4:
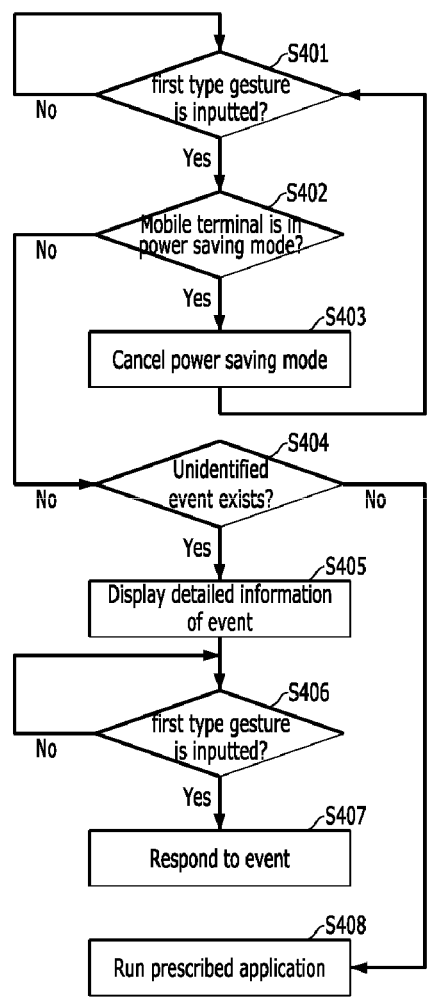
FIG. 4 is a flowchart for an operation of a mobile terminal according to the present invention.

FIG. 4 is a flowchart for an operation of a mobile 100 terminal according to the present invention.

Referring to FIG. 4, when a first type gesture is inputted [S401], if the mobile terminal 100 is in power saving mode [S402], the controller 180 cancels the power saving mode of the mobile terminal 100 and controls a current time to be outputted through the display unit 151 [S403]. In this case, the power saving mode maintains the display unit 151 in turned-off (OFF) state to reduce a power consumption of the mobile terminal 100. If a prescribed condition is met, the mobile terminal 100 can enter the power saving mode. For instance, if an input is not applied to the mobile terminal 100 for a prescribed time or a user input for entering the power saving mode is received, the mobile terminal 100 can enter the power saving mode. For another instance, if an event occurs in the mobile terminal 100 or a user input for cancelling the power saving mode is received, the power saving mode can be cancelled.

FIG. 5 is a diagram for one example of cancelling a power saving mode of a mobile terminal if a first type gesture is inputted.

Referring to FIG. 5, while the mobile terminal 100 is operating in power saving mode, like the example shown in FIG. 5 (*a*), the display unit 151 maintains an OFF state. When the mobile terminal 100 operates in the power saving mode, if a first type gesture is inputted, like the example shown in FIG. 5 (*b*), the controller 180 cancels the power saving mode of the mobile terminal 100 and is able to control a current time information to be displayed through the display unit 151. In the example shown in FIG. 5 (*b*), the first type gesture includes an action of pulling up a hand having the mobile terminal 100 worn thereon toward a user body.

Although the mobile terminal 100 does not operate in the power saving mode, if an event failing to be checked by a user exists in the mobile terminal 100 [S404], the controller 180 can control a detailed information of the event to be displayed through the display unit 151 [S405]. In this case, the event can include one of a reception of a message (e.g., a text message, an instant message, a push message, etc.), a presence of a missed absent call, a reception of an email, a case of meeting an alarm generation condition (e.g., a case that a current time is an alarm time, a case that a current time is a time for starting a pre-registered schedule, etc.), and the like. And, the detail information (or content) of the event may include one of a detailed content of a message (e.g., a text content of a text message, a text content of an instant message, etc.), a phone number of a missed incoming call, a detailed content of an email, an alarm content (e.g., an alarm time, a detailed content of a pre-registered schedule, etc.), and the like.

FIG. 6 is a diagram for one example of displaying detailed information of an event if a first type gesture is inputted.

Referring to FIG. 6, if an event occurs, like the example shown in FIG. 6 (a), the controller 180 is able to control a feedback to be outputted while displaying an indicator indicating that an event has occurred. In the example shown in FIG. 6 (a), an information indicating the occurrence of the event includes a guide text indicating that a message has been received. The feedback can be implemented with vibration or sound, by which the present invention is non-limited.

Subsequently, if a first type gesture input is received in a manner that a user moves a hand having the mobile terminal 100 worn thereon, like the example shown in FIG. 6 (b), the controller 180 can control a detailed information of the event to be displayed. In the example shown in FIG. 6 (b), the first type gesture input includes a user's action of pulling up an arm toward a user's body. As the first type gesture is inputted, the detailed content of the received message is displayed.

After the mobile terminal 100 has entered the power saving mode with the lapse of a prescribed time since the occurrence of the event, if the first type gesture is inputted, the controller 180 cancels the power saving mode and is also able to control an indicator, which indicates that the event has occurred, to be outputted.

For instance, FIG. 7 is a diagram for one example of outputting an indicator indicating an event occurrence if a first type gesture is inputted.

Referring to FIG. 7, if an event occurs, like the example shown in FIG. 7 (a), as mentioned in the foregoing description with reference to FIG. 6 (a), it is able to output an information indicating that the event has occurred.

If a prescribed time elapses since the occurrence of the vent, like the example shown in FIG. 7 (b), the controller 180 enters a power saving mode and is then able to turn off the display unit 151. Thereafter, if a first type gesture is inputted, like the example shown in FIG. 7 (c), the controller 180 can control an indicator, which indicates that the event has occurred, to be outputted.

If the indicator is touched or a first type touch gesture is inputted again, the controller 180 may be able to display a detailed information of the event.

While the detailed information of the event is displayed, if the first type gesture is inputted again [S406], the controller 180 can respond to the occurring event [S407]. In particular, while a phone number of a missed incoming call is displayed, if the first type gesture is inputted, the controller 180 can make a phone call to the corresponding number or can control a message-composing screen, which is provided to compose a message to send to the corresponding phone number, to be displayed. While the detailed content of the message is displayed, if the first type gesture is inputted, the controller 180 can control a message-composing screen, which is provided to compose a reply to a counterpart having sent the message, to be displayed or can make a phone call to the counterpart having sent the message.

For instance, FIG. 8 is a diagram for an operation of a mobile terminal if a first type gesture is inputted in the course of displaying a detailed information of an event.

Referring to FIG. 8, assume that a detailed content of a message is currently displayed [FIG. 8 (a)]. While the detailed content of the message is displayed, like the example shown in FIG. 8 (b), if a gesture input of pulling up an arm having the mobile terminal 100 worn thereon toward a user's body is received, the controller 180 can control a message-composing screen, which is provided to compose a reply to a counterpart having sent the message, to be displayed. In this case, the message-composing screen may include a text body region 810 for displaying an inputted content and a keypad region 820 usable for inputting a text, by which the present invention is non-limited.

Meanwhile, while the detailed content of the message is displayed, if a first type gesture input is received, the controller 180 can make a phone call to a counterpart having sent the message [not shown in the drawing]. In doing so, it is a matter of course that a gesture input for composing a message reply may be different from a gesture input for making a phone call.

While the detailed content of the event is displayed, if a second type gesture is inputted, the controller 180 can perform a scroll on the display unit 15 to control a content, which was not displayed on the display unit 151 in the detailed content of the event, to be displayed or to control a detailed content of a next event to be displayed.

For instance, FIG. 9A and FIG. 9B are diagrams for example of an operation of a mobile terminal if a second type gesture is inputted. For clarity of the following description, like the examples shown in FIG. 9A (a) and FIG. 9A (b), assume that a detailed content of a message is currently displayed through the display unit 151.

While the detailed content of the message is displayed, like the example shown in FIG. 9A (b), if a gesture of twisting a wrist having the mobile terminal 100 worn thereon is inputted and an input speed (e.g., a moving speed of the mobile terminal 100, etc.) of the gesture is smaller than a prescribed speed, the controller 180 can scroll the detailed content of the message in response to the gesture input. If the wrist is twisted in a top direction of the display unit 151, the controller 180 can scroll the detailed content of the message in a bottom direction (or the top direction). If the wrist is twisted in the bottom direction of the display unit 151, the controller 180 can scroll the detailed content of the message in the top direction (or the bottom direction).

While the detailed content of the message is displayed, like the example shown in FIG. 9B (b), if a gesture of twisting a wrist having the mobile terminal 100 worn thereon is inputted and an input speed of the gesture is equal to or greater than a prescribed speed, the controller 180 can control a detailed content of a next (or previous) message to be displayed in response to the gesture input. If the wrist is twisted in a top direction of the display unit 151, the controller 180 can control the detailed content of the next (ore previous) message to be displayed. If the wrist is twisted in the bottom direction of the display unit 151, the controller 180 can control the detailed content of the previous (or next) message to be displayed.

While a detailed content of an event is displayed, if a second type gesture is inputted, the controller 180 can enlarge or reduce an output of the display unit 151.

Figure 10A:
FIGS. 10(a) and 10(b) are diagrams for example of an operation of a mobile terminal if a second type gesture is inputted.
Figure 10B:

For instance, FIG. 10 is a diagram for example of an operation of the mobile terminal 100 if a second type gesture is inputted.

For clarity of the following description, like the examples shown in FIG. 10 (a), assume that a detailed content of a message is currently displayed through the display unit 151.

While a detailed content of a message is displayed, like the example shown I FIG. 10 (b), if a gesture input of adjusting a distance between two fingers (e.g., a thumb and an index finger, etc.) of a hand having the mobile terminal 100 worn thereon is received, the controller 180 can enlarge or reduce an output of the display unit 151 in response to the gesture input. If a gesture input of spreading two fingers is received, the controller 180 can enlarge (or reduce) the output of the display unit 151. If a gesture input of narrowing two fingers is received, the controller 180 can reduce (or enlarge) the output of the display unit 151.

While a detailed content of an event is displayed, if a second type gesture is inputted, the controller 180 can control a sound, which corresponds to TTS (text to sound) conversion of the detailed content of the event, to be outputted.

For instance, FIG. 11 is a diagram for example of an operation of a mobile terminal if a second type gesture is inputted. For clarity of the following description, like the example shown in FIG. 11 (a), assume that a detailed content of a message is currently displayed through the display unit 151.

While a detailed content of a message is displayed, like the example shown in FIG. 11 (b), if a gesture input of stretching five fingers is received, the controller 180 can control a result from converting the detailed content (e.g., a text, etc.) of the message to a sound to be outputted in response to the gesture input. While the sound is outputted, if a gesture input of folding the fingers is received, the controller 190 can control the sound to stop being outputted.

While the result from converting the detailed content of the message is outputted, like the example shown in FIG. 11 (c), if a user input of twisting a wrist is received, the controller 180 can control a result from converting a detailed content of a next or previous message to a sound to be outputted while displaying the detailed content of the next or previous message. If the wrist is twisted in a top direction of the display unit 151, the detailed content of the next (or previous) message can be displayed. If the wrist is twisted in a bottom direction of the display unit 151, the detailed content of the previous (or next) message can be displayed.

In the examples shown in FIG. 9A and FIG. 9B, an action of twisting a wrist is a gesture input for scrolling or switching a message. And, whether to scroll or switch the message is determined depending on a speed of twisting the wrist. And, it is a matter of course that a gesture different from that shown in FIG. 9A or FIG. 9B can be assigned for scrolling or switching a message. Moreover, although FIG. 10 shows that a gesture of adjusting a distance between fingers is assigned to enlarge or reduce an output of the display unit 151, it is a matter of course that a gesture different from that shown in FIG. 10 can be used to enlarge or reduce an output of the display unit 151. And, the present invention is non-limited by the gesture input exemplarily shown in FIG. 11.

When the first type gesture is inputted [S401], if the mobile terminal 100 is not in the power saving state [S402] and an event failing to be checked by a user does not exist in the mobile terminal [S404], the controller 180 can run a prescribed application or can control a currently running application to be switched to a prescribed application [S408].

FIG. 12 is a diagram for one example of running a prescribed application.

Referring to FIG. 12, while a current time is outputted [FIG. 12 (a)], if a first type gesture is inputted, the controller 180 can control a first application to be run [FIG. 12 (b)].

While a prescribed application is running, if the first type gesture is inputted again, like the example shown in FIG. 12 (c), the controller 180 stops running the first application and can control a second application to be run.

In this case, each of the first application and the second application can be determined in order of running an application most recently or in order of being used frequently by a user. Alternatively, each of the first application and the second application can be determined in a manner of being randomly designated by a user.

Like the example shown in FIG. 12, in case that a first type gesture input is received, it is able to raise user's accessibility to a prescribed application by running the prescribed application.

While the prescribed application is running, if a second type gesture is inputted, the controller 180 can perform a running control of the prescribed application in response to the second type gesture.

For instance, while an application (e.g., a music application, a video application, etc.) for playing a multimedia file (e.g., a music file, a video file) is running, if a second type gesture is inputted, the controller 180 can perform such an operation as a fast forward control (or a rewind control), a next/previous file play control, a play/pause control and the like.

Figure 13A:
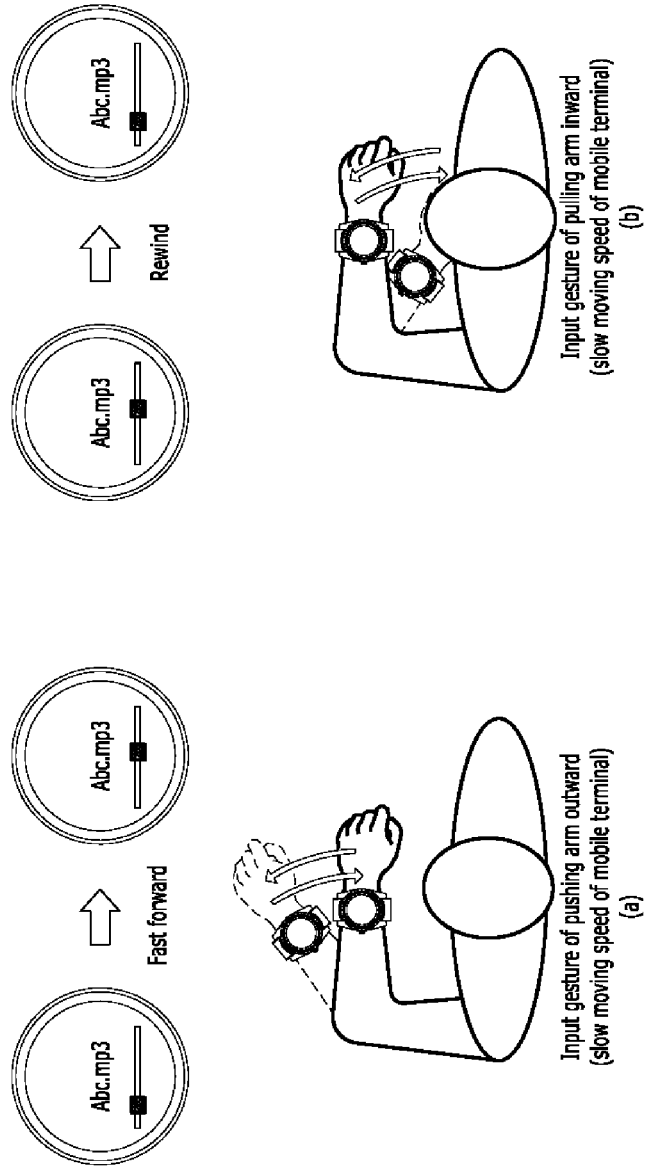
FIG. 13A and FIG. 13B are diagrams for one example to describe an operation of a mobile terminal if a second type gesture is inputted in the course of running a music application.
Figure 13B:
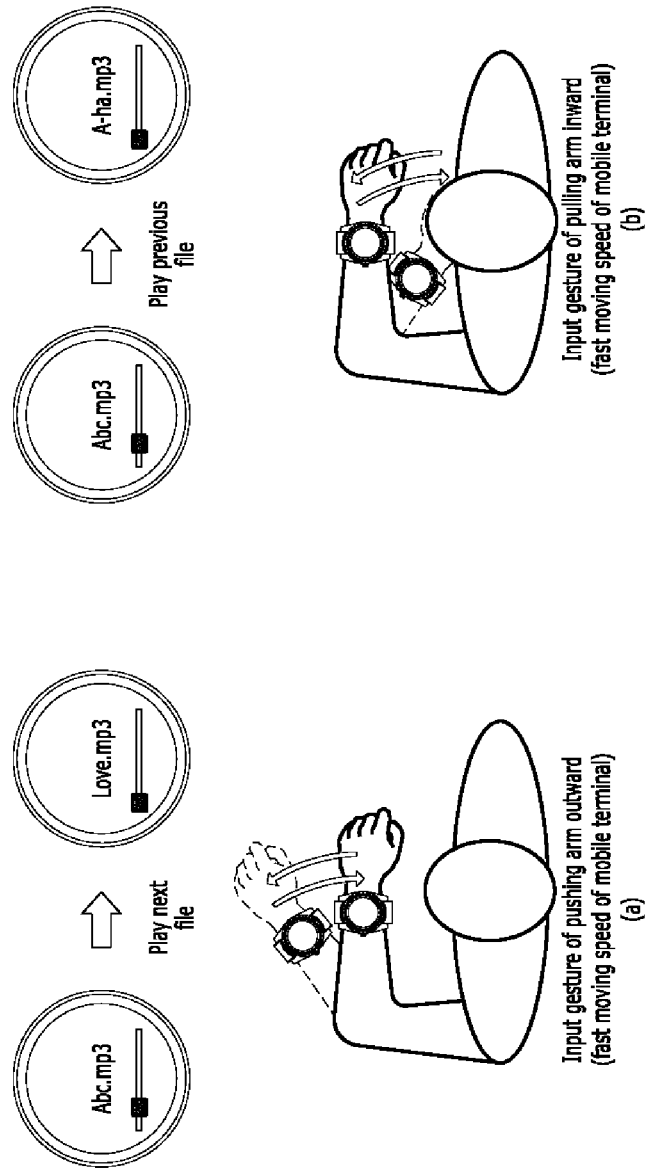

FIG. 13A and FIG. 13B are diagrams for one example to describe an operation of a mobile terminal if a second type gesture is inputted in the course of running a music application.

Referring to FIG. 13A, while a music file is played, like the example shown in FIG. 13A (a), if a gesture of shaking a hand having the mobile terminal 100 worn thereon from a user body outward is inputted and an input speed (i.e., a moving speed of the mobile terminal 100) of the gesture is smaller than a prescribed speed, the controller 180 can perform a fast forward operation (or a rewind operation) in response to the gesture input. On the contrary, while a music file is played, like the example shown in FIG. 13A (b), if a gesture of shaking a hand having the mobile terminal 100 worn thereon toward a user body inward is inputted and an input speed (i.e., a moving speed of the mobile terminal 100) of the gesture is smaller than a prescribed speed, the controller 180 can perform a rewind operation (or a fast forward operation) in response to the gesture input.

While a music file is played, like the example shown in FIG. 13B (a), if a gesture of shaking a hand having the mobile terminal 100 worn thereon from a user body outward is inputted and an input speed of the gesture is equal to or greater than a prescribed speed, the controller 180 can start to play a next music file (or a previous music file) in response to the gesture input. On the contrary, while a music file is played, like the example shown in FIG. 13B (b), if a gesture of shaking a hand having the mobile terminal 100 worn thereon toward a user body inward is inputted and an input speed of the gesture is equal to or greater than a prescribed speed, the controller 180 can start to play a previous music file (or a next music file) in response to the gesture input.

While an application (e.g., a music application, a video application, etc.) for playing a multimedia file (e.g., a music file, a video file) is running, if a second type gesture is inputted, the controller 180 can perform a play order shuffle operation.

Figure 14:
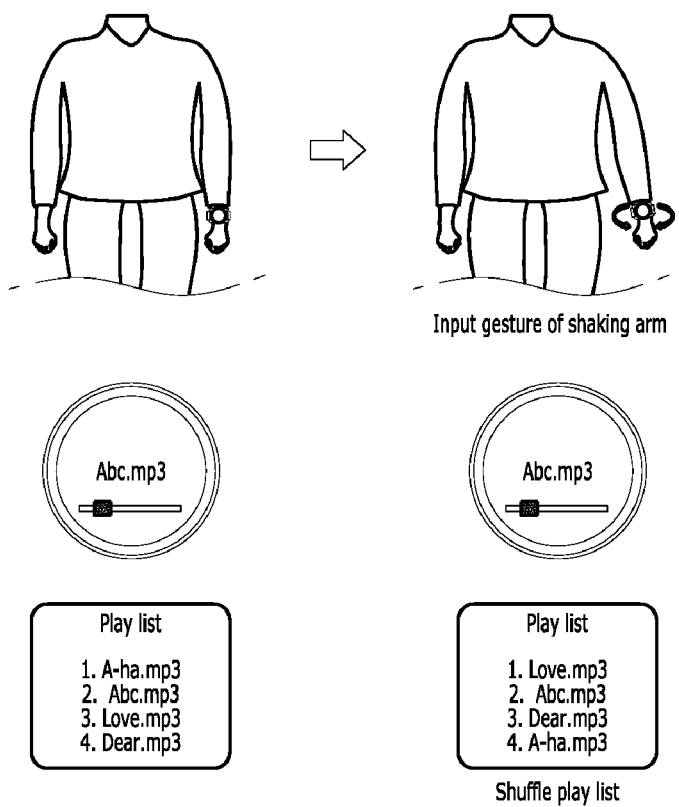
FIG. 14 is a diagram for one example to describe an operation of a mobile terminal if a second type gesture is inputted in the course of running a music application.

FIG. 14 is a diagram for one example to describe an operation of the mobile terminal 100 if a second type gesture is inputted in the course of running a music application.

Referring to FIG. 14, while several music files are set to be played in order, if a gesture of shaking a hand having the mobile terminal 100 worn thereon is inputted [FIG. 14 (a)], the controller 180 can change a play order of music file in response to the gesture input [FIG. 14 (b)].

In response to a gesture input, the controller 180 can play a multimedia file or stop (or pause) a play of the multimedia file.

Figure 15A:
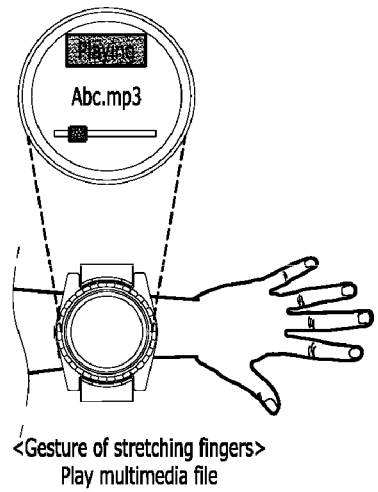
FIGS. 15(a) and 15(b) are diagrams for example of an operation of a mobile terminal if a second type gesture is inputted.
Figure 15B:
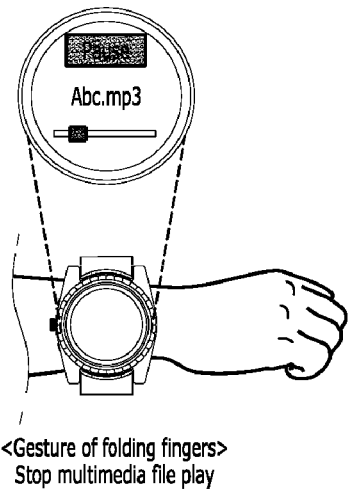

FIG. 15 is a diagram for example of an operation of the mobile terminal 100 if a second type gesture is inputted.

Like the example shown in FIG. 15 (a), if a gesture of stretching all fingers of a hand having the mobile terminal 100 worn thereon is inputted, the controller 180 can control a multimedia file (e.g., a music file, a video file, etc.) to start to be played in response to the gesture input.

Like the example shown in FIG. 15 (b), if a gesture of folding all fingers of a hand having the mobile terminal 100 worn thereon is inputted in the course of playing a multimedia file, the controller 180 can control a play of the multimedia file to be stopped (or paused) in response to the gesture input.

In the examples shown in FIG. 13A and FIG. 13B, an action of shaking a hand from a user body outward or an action of shaking a hand toward a user body inward is to change a play time (i.e., a fast forward or a rewind) or to change a currently played multimedia file. Moreover, depending on a speed of moving a hand, it is able to determine whether to change a play time of a multimedia file or whether to change a multimedia file. Yet, the present invention is non-limited by the gesture inputs shown in FIG. 13A and FIG. 13B. And, a gesture different from that of the example shown in FIG. 13A or FIG. 13B can be assigned for a multimedia file play time change or a multimedia file change.

Figure 16A:
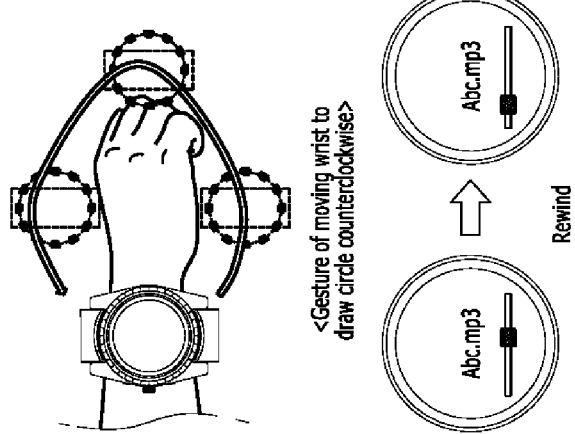
FIGS. 16(a) and 16(b) are diagrams for one example of changing a play time of a multimedia file.
Figure 16B:
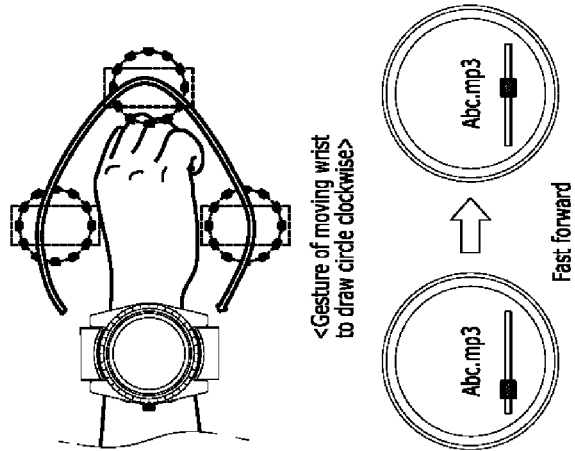

For instance, FIG. 16 is a diagram for another example of changing a play time of a multimedia file.

Referring to FIG. 16, while the mobile terminal 100 is worn on a wrist, if the wrist is moved to draw a circle clockwise by maintaining a display unit facing direction uniformly (i.e., the display unit 151 is maintained to face upward), like the example shown in FIG. 16 (a), the controller 180 can perform a fast forward action (or a rewind action). On the contrary, while the mobile terminal 100 is worn on a wrist, if the wrist is moved to draw a circle counterclockwise by maintaining a display unit facing direction uniformly (i.e., the display unit 151 is maintained to face upward), like the example shown in FIG. 16 (b), the controller 180 can perform a rewind action (or a fast forward action).

Moreover, although FIG. 14 shows that an action of shaking a hand is a gesture input for shuffling a play order, another gesture different from that shown in FIG. 14 can be assigned to a gesture input for shuffling a play order.

And, it is a matter of course that a gesture different from that shown in FIG. 15 can be assigned to a gesture input for adjusting a play of a multimedia file.

As mentioned in the foregoing description, if a first type gesture is inputted, depending on a presence or non-presence of an event failing to be checked by a user, the controller 180 can change an operation mode of the mobile terminal 100 (e.g., enter a read mode for displaying a detailed information, switch to an input mode for inputting a text from a read mode, switch to a call mode for sending a call from a read mode, etc.) or can run an application of the mobile terminal 100.

If a second type gesture is inputted, the controller 180 can control an appropriate control operation to be performed while maintaining a currently display content (i.e., maintaining a display of a detailed information of an event, maintaining a currently running application, etc.).

Unlike the former example mentioned in the foregoing description, when an event occurs, even if a second type gesture is inputted, the mobile terminal 100 according to the present invention can display a detailed information of the event. As the detailed information of the event is displayed in response to the second type gesture, it is able to prevent a user from inputting a first type gesture repeatedly.

For instance, while the mobile terminal 100 is operating in power saving mode, if a first type gesture is inputted, as mentioned in the foregoing description with reference to FIG. 5, the controller 180 can cancel the power saving mode of the mobile terminal 100. In doing so, if an event failing to be checked by a user exists in the mobile terminal 100, an indicator indicating that the vent has occurred can be outputted together with a current time information as soon as the power saving mode of the mobile terminal 100 is cancelled. While the indicator is outputted, if a user attempts to check a detailed content of the event, as mentioned in the foregoing description with reference to FIG. 6 (a), it may be necessary to input the first type gesture again.

Thus, after the mobile terminal 100 has entered the power saving mode, it may be necessary for the user to repeatedly input the first type gesture twice in order to check the detailed content of the event. Yet, since the moving distance of the mobile terminal 100 is relatively long in case of the first type gesture, like the former examples shown in FIG. 3A and FIG. 3B, if the user is forced to input the first type gesture consecutively, it may cause inconvenience to the user.

Therefore, when an event occurs, even if a second type gesture is inputted, the mobile terminal 100 according to the present invention may be able to display a detailed information of the event.

Figure 17A:
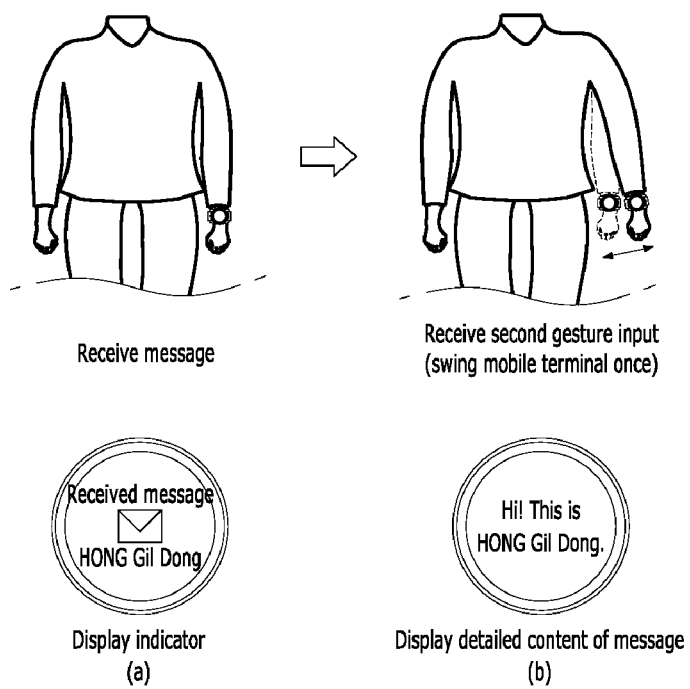
FIG. 17A and FIG. 17B are diagrams for one example of displaying a detailed information of an event if a second type gesture is inputted.
Figure 17B:
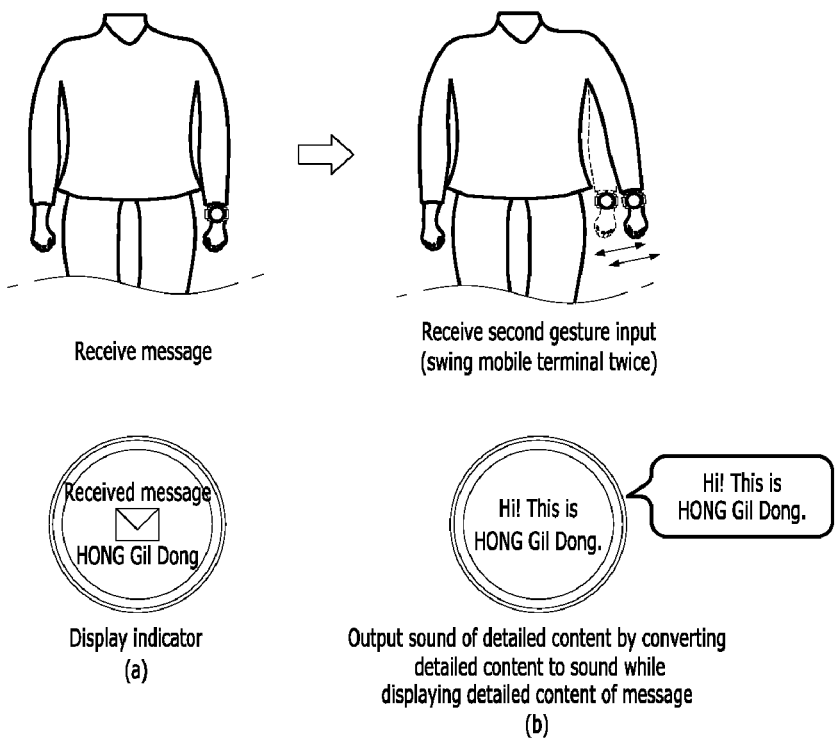

For instance, FIG. 17A and FIG. 17B are diagrams for one example of displaying a detailed information of an event if a second type gesture is inputted.

If an event failing to be checked exists, like the example shown in FIG. 17A (a), the controller 180 can control an indicator indicating an occurrence of an event to be outputted. Thereafter, like the example shown in FIG. 17 (b), if a gesture of swinging a hand having the mobile terminal 100 worn thereon once is inputted, the controller 180 can control a detailed information of the event to be displayed.

The controller 180 can control a result from converting the detailed information of the event to audio or sound to be outputted while displaying the detailed information of the event. For instance, while an indicator indicating an occurrence of an event is outputted [FIG. 17B (a)], like the example shown in FIG. 17B (b), if a gesture of swinging a hand having the mobile terminal 100 worn thereon twice is inputted, the controller 180 can control a result from converting a detailed information of the event to sound or audio to be outputted while displaying the detailed information of the event.

FIG. 17A or FIG. 17B shows one example of displaying a detailed information of an event in response to a gesture of swinging a hand, by which a gesture input for displaying the detailed information of the event is non-limited.

Due to the above-mentioned reason, while a detailed information of an event is displayed, if a second type gesture is inputted, the mobile terminal 100 according to the present invention can change an operation mode of the mobile terminal 100. As the operation mode of the mobile terminal 100 is switched to a call mode or an input mode by the second type gesture, it is able to prevent a user from inputting a first type gesture repeatedly.

Figure 18A:
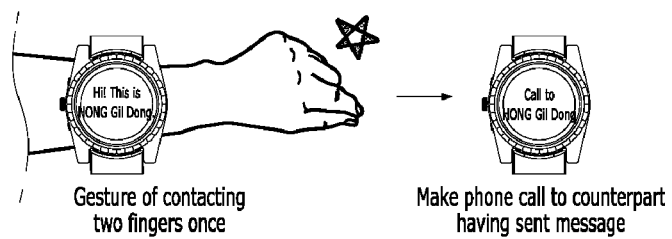
FIGS. 18(a) and 18(b) are diagrams for one example of changing an operation mode of a mobile terminal if a second type gesture is inputted.
Figure 18B:
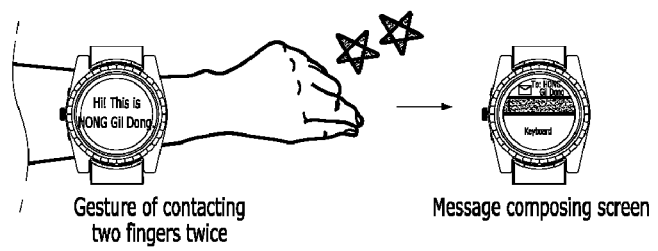

For instance, FIG. 18 is a diagram for one example of changing an operation mode of the mobile terminal 100 if a second type gesture is inputted.

Referring to FIG. 18 (a), while a detailed information of an event is displayed, if a gesture input of contacting two fingers (e.g., a thumb and an index finger) with each other once is received, the controller 180 can make a phone call to a counterpart having sent a message.

Referring to FIG. 18 (b), while a detailed information of an event is displayed, if a gesture input of contacting two fingers with each other twice is received, the controller 180 can control a message-composing screen for composing a reply to be displayed.

FIG. 18 shows one example that an operation mode of the mobile terminal 100 is changed in response to a gesture of contacting two fingers with each other, by which a gesture input for changing an operation mode of the mobile terminal 100 is non-limited.

When an incoming call is received, the mobile terminal 100 according to the present invention can answer or decline the incoming call depending on a user's gesture input. For instance, when an incoming call is received, if a first type gesture is inputted, the controller 180 can answer the incoming call. When an incoming call is received, if a second type gesture is inputted, the controller 180 can decline the incoming call.

Figure 19A:
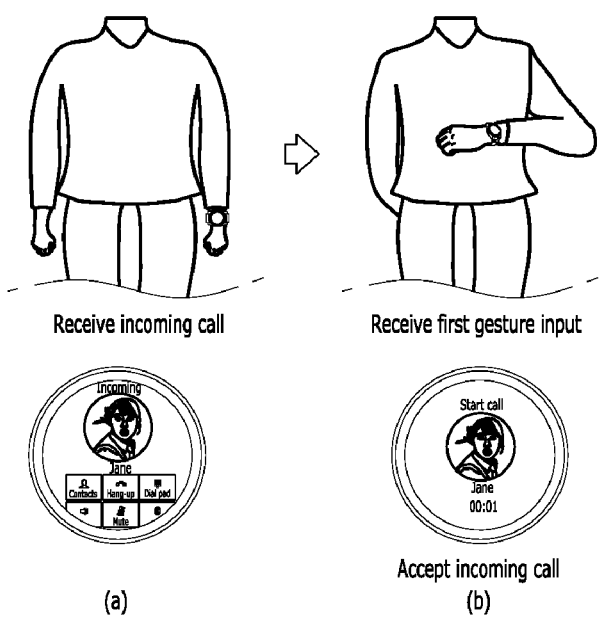
Figure 19B:
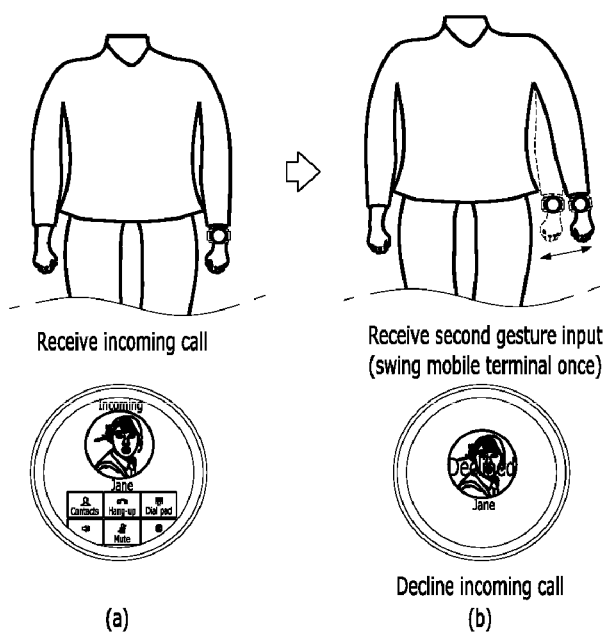

FIGS. 19A to 19C are diagrams for examples of an operation of the mobile terminal 100 if a gesture input is received on receiving an incoming call.

Like the example shown in FIG. 19A (a), when an incoming call is received, the controller 180 can control an information (e.g., an information on a counterpart having made the phone call, etc.), which indicates that the incoming call is received, and a feedback (e.g., vibration, sound, etc.) to be outputted. While the incoming call is received, if a gesture of lifting a hand having the mobile terminal 100 worn thereon up toward a user body is inputted, like the example shown in FIG. 19A (b), the controller 180 can answer the incoming call.

On the other hand, while an incoming call is received, if a gesture of swinging a hand having the mobile terminal 100 worn thereon is inputted, like the example shown in FIG. 19B (b), the controller 180 can decline the incoming call. As the incoming call is declined, while a presence of a missed call is notified, if a first type gesture (e.g., a gesture of lifting the hand having the mobile terminal 100 worn thereon up toward a user body, etc.) is inputted, like the example shown in FIG. 19B (c), the controller 180 can control a detailed information of the declined phone call to be displayed. In this case, the detailed information of the declined phone call may include at least one of a name of counterpart having made the phone call, a phone number of the counterpart having made the phone call, and an information on an incoming call received time.

When the controller 100 declines the incoming call, the controller 180 can automatically send a message indicating that a user is unable to answer the phone call to the counterpart having made the phone call.

For instance, like the example shown in FIG. 19C (a), when the incoming call is received, if a gesture of swinging a hand having the mobile terminal 100 worn thereon twice is inputted, like the example shown in FIG. 19C (b), the controller 180 can automatically send a message to an incoming call declined counterpart while declining the incoming call. Thereafter, if a first type gesture (e.g., a gesture of lifting the hand having the mobile terminal 100 worn thereon up toward a body) is inputted, like the example shown in FIG. 19C (c), the controller 180 can control a detailed content of the message having sent to the counterpart to be displayed.

For clarity of the descriptions with reference to FIGS. 19A to 19C, in response to a user's gesture of lifting a hand up toward a body or a user's gesture of swinging a hand, an incoming call is answered or declined. Yet, it is a matter of course that another gesture input different from that shown in one of the examples shown in FIGS. 19A to 19C can be assigned to answer or decline an incoming call.

If an alarm generation condition is met, the controller 180 can output such an alarm as a vibration, a sound and the like. For instance, if a current time is a preset alarm time or a time at which a pre-registered schedule starts, the controller 180 can control at least one of a vibration, a sound and the like to be outputted.

As mentioned in the foregoing description with reference to FIG. 4, when an alarm generation condition is met, if a first type gesture is inputted, the controller 180 can control a detailed content of an alarm occurrence to be displayed. For instance, as a current time is an alarm time, when an alarm is outputted, if a first type gesture is inputted, the controller 180 can control a detailed information, which includes at least one of a name of a set alarm and a set alarm time, to be outputted. For another instance, as a current time is a time for starting a pre-registered schedule, when an alarm is outputted, if a first type gesture is inputted, the controller 180 can control a detailed information, which includes at least one of a name of the pre-registered schedule, a time for starting a schedule and a schedule starting location, to be outputted.

As an alarm generation condition is met, if a second type gesture is inputted in the course of outputting an alarm, the controller 180 can end the output of the alarm or postpone the output of the alarm to start after a prescribed time [snooze].

Figure 20A:
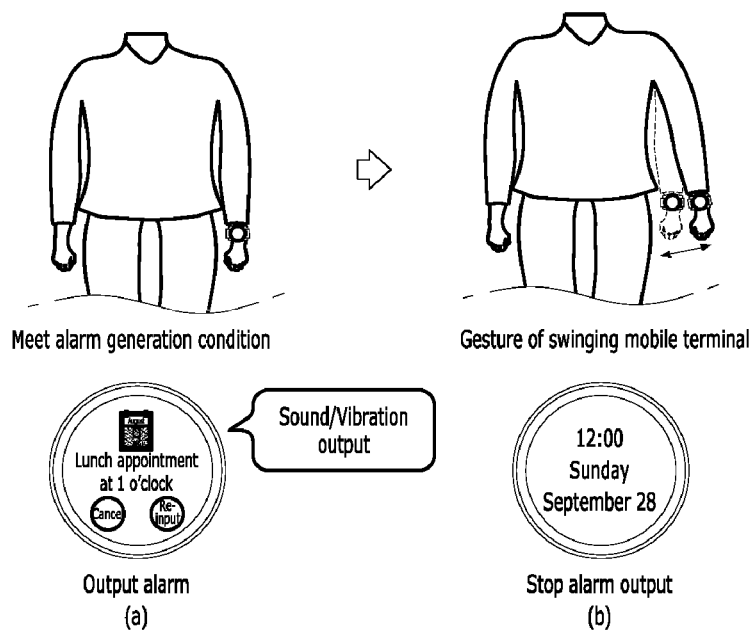
FIG. 20A and FIG. 20B are diagrams for an operation of a mobile terminal if a second type gesture is inputted on outputting an alarm.
Figure 20B:
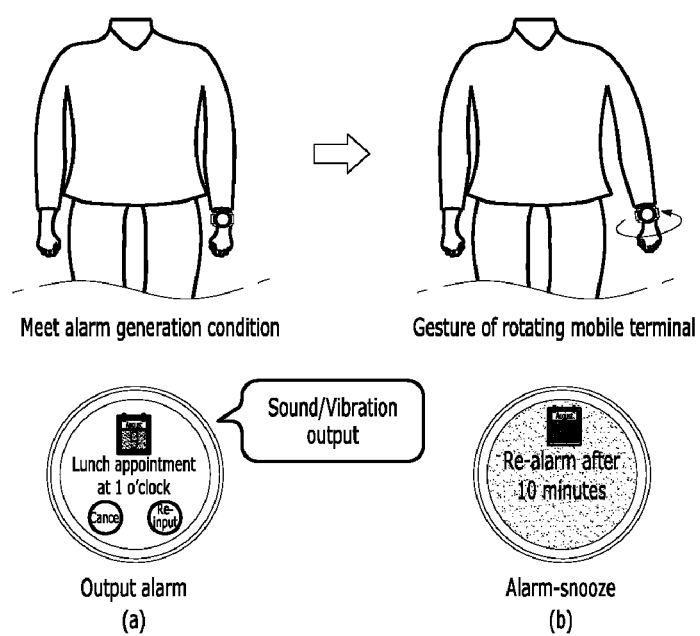

For instance, FIG. 20A and FIG. 20B are diagrams for an operation of a mobile terminal if a second type gesture is inputted on outputting an alarm.

Referring to FIG. 20A, as an alarm generation condition is met, while an alarm is outputted [FIG. 20A (a)], if a gesture of swinging the mobile terminal 100 is inputted, the controller 180 can control the alarm to stop being outputted [FIG. 20A (b)].

On the other hand, referring to FIG. 20B, as an alarm generation condition is met, while an alarm is outputted [FIG. 20B (a)], if a gesture of rotating the mobile terminal 100 is inputted, the controller 180 can delay the alarm output after a prescribed time [FIG. 20B (b)].

FIG. 20A and FIG. 20B show examples of controlling an alarm output through a gesture of swinging an arm or a gesture of rotating an arm, by which a gesture for controlling an alarm output is non-limited. For instance, various kinds of gestures can be used to control an alarm output.

Based on a user's gesture input, the mobile terminal 100 according to the present invention can change the settings of the mobile terminal 100. In particular, the controller 180 is able to adjust a vibration mode or an audio output mode in response to a gesture input. And, the controller 180 can adjust a volume or a brightness of the display unit 151 in response to a gesture input.

For instance, FIG. 21 is a diagram for one example of adjusting a vibration mode or an audio output mode by a gesture input. Like the example shown in FIG. 21 (a) and FIG. 21 (b), while the display unit 151 of the mobile terminal 100 is covered, if a gesture of lifting the mobile terminal 100 up in front of a body is inputted, the controller 180 can control an audio output mode and a vibration mode to be switched to each other. In the example shown in FIG. 21 (a) and FIG. 21 (b), an audio output mode of the mobile terminal 100 is switched to a vibration mode.

FIG. 22 is a diagram for one example of adjusting a brightness of a display unit.

Referring to FIG. 22, while the mobile terminal 100 is worn on a wrist, if the wrist is moved to draw a circle clockwise by maintaining a display unit facing direction uniformly (i.e., the display unit 151 is maintained to face upward), like the example shown in FIG. 22 (a), the controller 180 can control the brightness of the display unit 151 to increase (or decrease).

On the other hand, while the mobile terminal 100 is worn on a wrist, if the wrist is moved to draw a circle counterclockwise by maintaining a display unit facing direction uniformly (i.e., the display unit 151 is maintained to face upward), like the example shown in FIG. 22 (b), the controller 180 can control the brightness of the display unit 151 to decrease (or increase).

Thus, like the examples shown in FIG. 21 and FIG. 22, the controller 180 is able to adjust the settings of the mobile terminal in response to a gesture input. Yet, the gesture inputs shown in FIG. 21 and FIG. 22 are proposed just for clarity of the descriptions.

In particular, it is a matter of course that other gesture inputs different from those shown in the drawings can apply to adjusting the settings of the mobile terminal 100.

The mobile terminal 100 according to the present invention can unlock the display unit 151 through a user's gesture input. In particular, the controller 180 can unlock the display unit 151 by considering at least one of a finger motion, a count of a finger wag, and a location of a wagged finger.

For instance, FIG. 23 is a diagram for one example of unlocking the display unit 151. For clarity of the following description, assume that an action of wagging an index finger once and then wagging a ring finger twice is set as a password.

Referring to FIG. 23, if the display unit 151 is locked, the controller 180 can set a state of the display unit 151 to a locked state until a password for unlocking the display unit 151 is inputted. In this case, the locked state means a state for authenticating a presence of authority for using the mobile terminal before accessing a content saved in the mobile terminal 100 or an application installed in the mobile terminal 100. If a state of the display unit 151 is set to the locked state, like the example shown in FIG. 23 (a), the controller 180 can control a locked screen containing a current time information to be displayed.

While the state of the display unit 151 is set to the locked state, like the example shown in FIG. 23 (b), if a gesture input of wagging fingers is received, the controller 180 can determine whether the gesture input matches a preset password. For instance, if a gesture of wagging a thumb once and then wagging a ring finger twice is inputted, the controller 180 determines that the gesture matching the password is inputted and is then able to unlock the display unit 151. Once the display unit 151 is unlocked, the controller 180 controls an information, which has been displayed before the display unit 151 entered the locked state, to be displayed or, like the example shown in FIG. 23 (c), can control a home screen to be displayed.

While the mobile terminal 100 is operating in a power saving state or a state of the display unit 151 is set to a locked state, if an event occurs, the controller 180 can control a locked screen, which includes an indicator indicating a current time information and an occurrence of the event, to be displayed. In doing so, when a gesture input of wagging finger(s) is received, if the received gesture input matches a preset password, the controller 180 unlocks the display unit 151 and is also able to control a detailed information of the event to be displayed. The controller 180 can control a result from converting the detailed information of the event to audio or sound to be outputted as soon as outputs the detailed information of the event.

In addition, the mobile terminal 100 according to the present invention sets a mode of the mobile terminal 100 to a power saving mode or can control the mobile terminal 100 to enter a normal mode from the power saving mode, through a user's gesture input. This is described in detail with reference to FIG. 24 as follows.

FIG. 24 is a diagram for one example of switching a mode of a mobile terminal to a power saving mode.

Referring to FIG. 24, assume that an action of wagging one of fingers twice consecutively is a gesture input for a power saving mode switching. While the display unit 151 is turned on, if a gesture input of wagging a random finger twice is received [FIG. 24 (a)], the controller 180 controls the mobile terminal 100 to enter a power saving mode and is able to control the display unit 151 to be turned off [FIG. 24 (b)].

On the other hand, while the display unit 151 is turned off, like the example shown in FIG. 24 (b), if a gesture input of wagging a random finger twice is received, like the example shown in FIG. 24 (a), the controller 180 cancels the power saving mode and is able to control the display unit 151 to be turned on.

In case that an event occurs, the mobile terminal 100 according to the present invention can output a feedback in form of at least one of vibration and sound. When the vibration is outputted in accordance with the event occurrence, if a user is moving vigorously (e.g., a user is exercising), it is difficult for the user to sense the vibration. Hence, if the controller 180 determines that the user is moving vigorously, the controller 180 can control an output strength of the vibration to be automatically raised. In particular, the controller 180 can determine whether the user is moving vigorously based on such a sensing signal of the sensing unit 140 as a motion of the mobile terminal 100, a moving speed of the mobile terminal 100 and the like.

Figure 25A:
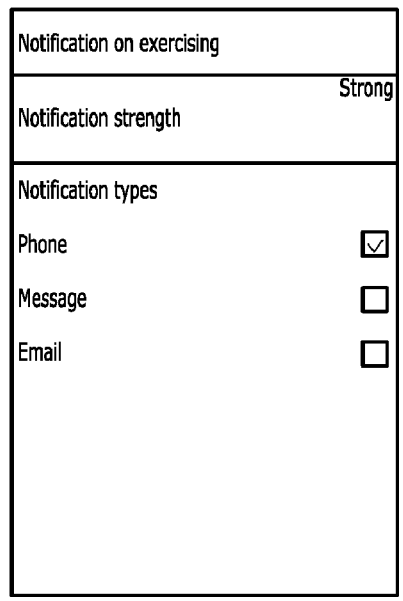
FIGS. 25(a) and 25(b) are diagrams for one example of adjusting whether to output a feedback depending on a type of an event.
Figure 25B:
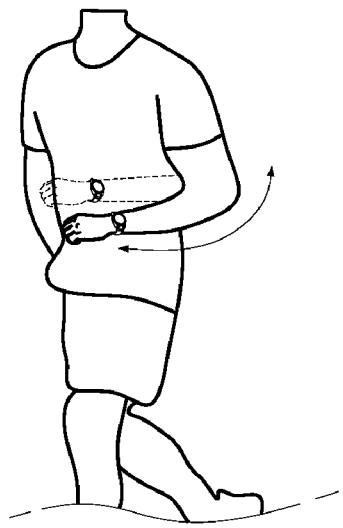

For another instance, if a user is moving vigorously, the mobile terminal 100 according to the present invention can control a feedback for an event preset by a user to be outputted only. For example, like the example shown in FIG. 25 (a), assume that a user has preset a feedback to be outputted only if there is an incoming call in the course of exercising. Thereafter, like the example shown in FIG. 25 (b), while a user is moving vigorously (e.g., exercising, etc.), if there is an incoming call that is a preset event, the controller 180 output a feedback. If an event (e.g., a reception of a message, etc.) other than the preset event occurs, the controller 180 can skip the feedback output.

In the examples shown in FIG. 4 and FIG. 12, if a first type gesture is inputted, it is able to run a prescribed application in response to the first type gesture input.

Moreover, as mentioned in the foregoing description with reference to FIG. 12, the prescribed application may include a most recently run application or a most frequently used application.

On the other hand, after a second type gesture has been inputted, if a first type gesture is inputted, the controller 180 can determine an application, which is to be run by the first type gesture, based on a type of the second type gesture, a count of inputs of the second type gesture, an inputted duration of the second type gesture and the like.

For instance, FIG. 26A and FIG. 26B are diagrams for one example of adjusting an application to run in response to an input count of a second type gesture.

Like the example shown in FIG. 26A, after a gesture of swinging a hand having the mobile terminal 100 worn thereon once has been inputted, if a gesture of lifting up the hand toward a body is inputted, the controller 180 can control a first application (e.g., a music application in FIG. 26A) to be run.

Like the example shown in FIG. 26B, after a gesture of swinging a hand having the mobile terminal 100 worn thereon twice has been inputted, if a gesture of lifting up the hand toward a body is inputted, the controller 180 can control a second application (e.g., a message application in FIG. 26B) to be run.

Like the examples shown in FIG. 26A and FIG. 26B, the controller 180 can determine an application, which is to be run, based on a second type gesture inputted before inputting a first type gesture.

Accordingly, embodiments of the present invention provide various effects and/or features.

First of all, the present invention provides a mobile terminal and controlling method thereof, by which user's convenience can be enhanced.

In particular, the present invention is to provide a mobile terminal and controlling method thereof, by which the mobile terminal can be remotely controlled based on a user's gesture input.

Moreover, a user is facilitated to remotely control a mobile terminal in a manner that a gesture input for performing a content change or a mode change and a gesture input for performing a general control operation without the content change or the mode change are discriminated from each other depending on a type of a gesture input.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A watch-type mobile terminal comprising:
   a sensor configured to sense a movement of fingers on a user's hand corresponding to a wrist on which the mobile terminal is worn by the user;
   a display; and
   a controller configured to:
      identify a first gesture input based on input received from the sensor, wherein the first gesture input corresponds to a movement or rotation of the watch-type mobile terminal;
      cause the display to display information of an event at the watch-type mobile terminal in response to identifying the first gesture input; and
      cause the display to display a response screen for responding to the event when the first gesture input is identified again while the information of the event is displayed,
   wherein the controller is further configured to:
      increase a brightness of the display in response to a second gesture input identified via the sensor, wherein the second gesture input corresponds to a lateral clockwise movement of the watch-type mobile terminal while worn on a wrist of the user such that a direction that the display faces is maintained during the lateral clockwise movement; and
      decrease the brightness of the display in response to a third gesture input identified via the sensor, wherein the third gesture input corresponds to a lateral counterclockwise movement of the watch-type mobile terminal while worn on the wrist of the user such that the direction that the display faces is maintained during the lateral counterclockwise movement.

2. The watch-type mobile terminal of claim 1, wherein the response screen comprises a message-composing screen when the event is an incoming message.

3. The watch-type mobile terminal of claim 1, wherein the response screen comprises a telephone call-placing screen when the event is an unanswered incoming telephone call.

4. The watch-type mobile terminal of claim 1, further comprising an audio output, wherein the controller is further configured to:
   identify a fourth gesture input based on input received from the sensor while the detailed information of the event is displayed,
   cause the display to display a scrolling portion of the detailed information;
   cause the display to display the detailed information in an increased size or a reduced size; and
   cause the audio output to output the detailed information converted to voice audio.

5. The watch-type mobile terminal of claim 1,
   wherein the controller is further configured to:
   identify a fourth gesture input based on input received from the sensor while a multimedia playback application is being executed;
   stop playback of a currently playing multimedia file of the multimedia playback application; and
   change a playlist order of the multimedia playback application or change a current playback time point of the currently playing multimedia file in response to the fourth gesture input.

6. The watch-type mobile terminal of claim 1, wherein:
   the event is an incoming telephone call;
   the response screen comprises a connected telephone call screen; and
   the controller is further configured to:
      accept the incoming telephone call when the first gesture input is identified; and
      identify a fourth gesture input based on input received from the sensor, and decline the incoming telephone call when the fourth gesture input is identified.

7. The watch-type mobile terminal of claim 6, further comprising a communication unit, wherein the controller is further configured to cause the communication unit to send a message to a mobile terminal corresponding to the incoming telephone call when the incoming telephone call is declined when the fourth gesture input is identified.

8. The watch-type mobile terminal of claim 7, wherein the controller is further configured to cause the display to display the sent message in response to identifying the fourth gesture input after the incoming telephone call has been declined.

9. The watch-type mobile terminal of claim 1, wherein:
   the event is an alarm;

the detailed information includes alarm information or schedule information associated with the alarm; and the controller is further configured to identify a fourth gesture input based on input received from the sensor, and turn off the alarm or snooze the alarm when the second gesture input is identified.

10. A method of controlling a watch-type mobile terminal, the method comprising:
identifying a first gesture input based on input received from the sensor, wherein the first gesture input corresponds to a movement or rotation of the watch-type mobile terminal;
displaying information of an event at the watch-type mobile terminal in response to identifying the first gesture input;
displaying a response screen for responding to the event when the first gesture input is identified again while the information of the event is displayed;
increasing a brightness of the display in response to a second gesture input identified via the sensor, wherein the second gesture input corresponds to a lateral clockwise movement of the watch-type mobile terminal while worn on a wrist of the user such that a direction that the display faces is maintained during the lateral clockwise movement; and
decreasing the brightness of the display in response to a third gesture input identified via the sensor, wherein the third gesture input corresponds to a lateral counterclockwise movement of the watch-type mobile terminal while worn on the wrist of the user such that the direction that the display faces is maintained during the lateral counterclockwise movement.

11. The method of claim 10, wherein the response screen comprises a message-composing screen when the event is an incoming message.

12. The method of claim 10, wherein the response screen comprises a telephone call-placing screen when the event is an unanswered incoming telephone call.

13. The method of claim 10, further comprising:
identifying a fourth gesture input based on input received from the sensor while the detailed information of the event is displayed, and in response to identifying the fourth gesture input:
displaying a scrolling portion of the detailed information;
displaying the detailed information in an increased size or a reduced size; or
outputting audio of the detailed information converted to voice audio.

14. The method of claim 10,
identifying a fourth gesture input based on input received from the sensor while a multimedia playback application is being executed;
stopping playback of a currently playing multimedia file of the multimedia playback application; and
changing a playlist order of the multimedia playback application or changing a current playback time point of the currently playing multimedia file in response to the fourth gesture input.

15. The method of claim 10, wherein the event is an incoming telephone call and the method further comprises:
accepting the incoming telephone call in response to identifying the first gesture input, wherein the response screen comprises a connected telephone call screen; and
identifying a fourth gesture input based on input received from the sensor, and declining the incoming telephone call in response to identifying the fourth gesture input.

* * * * *